United States Patent
Devireddy et al.

(10) Patent No.: US 9,325,530 B2
(45) Date of Patent: Apr. 26, 2016

(54) MANAGEMENT OF VIRTUAL DESKTOP INFRASTRUCTURE (VDI) SESSIONS USING REAL-TIME NETWORK CONDITIONS

(75) Inventors: Dileep K. Devireddy, San Jose, CA (US); Subha Dhesikan, San Jose, CA (US); Herman Levenson, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 724 days.

(21) Appl. No.: 13/477,749

(22) Filed: May 22, 2012

(65) Prior Publication Data

US 2013/0318522 A1 Nov. 28, 2013

(51) Int. Cl.
*G06F 9/455* (2006.01)
*H04L 12/64* (2006.01)

(52) U.S. Cl.
CPC .................................. *H04L 12/6418* (2013.01)

(58) Field of Classification Search
CPC .................................................. H04L 12/6418
USPC ............. 709/227–229, 226, 232–235; 718/1, 718/100, 102–105
See application file for complete search history.

(56) References Cited

U.S. PATENT DOCUMENTS

| | | | | |
|---|---|---|---|---|
| 7,532,642 B1* | 5/2009 | Peacock | | 370/468 |
| 7,917,533 B2* | 3/2011 | Nagami et al. | | 707/785 |
| 8,307,187 B2* | 11/2012 | Chawla et al. | | 711/173 |
| 8,869,141 B2* | 10/2014 | Lauwers et al. | | 717/176 |
| 2009/0265361 A1* | 10/2009 | Nagami et al. | | 707/10 |
| 2010/0070978 A1 | 3/2010 | Chawla et al. | | |
| 2010/0088397 A1 | 4/2010 | Jaudon et al. | | |
| 2011/0225578 A1 | 9/2011 | Lauwers et al. | | |

* cited by examiner

*Primary Examiner* — Kenneth R Coulter
(74) *Attorney, Agent, or Firm* — Edell, Shapiro & Finnan, LLC

(57) ABSTRACT

Devices, methods and instructions encoded on computer readable medium are provided herein for management of virtual desktop infrastructure (VDI) sessions in a VDI system based on real-time network conditions. In one example, a request for allocation of bandwidth to a first VDI session configured to operate in parallel with a plurality of other VDI sessions in a network is received at a network device. The real-time conditions of the network are detected, and the network device uses these real-time network conditions to determine if sufficient bandwidth is available to satisfy the request for allocation of bandwidth to the first VDI session. A determination is then performed, based on one or more provisioned policies, to determine how bandwidth is to be allocated between the first VDI session and the other parallel VDI sessions. Bandwidth may then be allocated to the first VDI session.

26 Claims, 6 Drawing Sheets

MANAGEMENT OF VIRTUAL DESKTOP INFRASTRUCTURE (VDI) SESSIONS USING REAL-TIME NETWORK CONDITIONS

TECHNICAL FIELD

The present disclosure generally relates to virtual desktops.

BACKGROUND

Organizations (e.g., corporations, universities, etc.) are moving away from traditional personal computer (PC) desktops in favor of a Virtual Desktop Infrastructure (VDI). VDI refers to the use of computer virtualization technology to provide centrally-managed desktops to users at remote client devices. More specifically, a software emulation of a computer is used to execute programs in the same way programs would execute on a hardware computer. The software emulation of a computer in such a context is referred to as a "virtual machine" (VM). A VM can be configured to provide a "virtual desktop" to a user. In such arrangements, the virtual desktop is executed on a remote central server, instead of on the local storage of the client. Therefore, when users work from their client device, all of the programs, applications, processes, and data are stored and run centrally, allowing users to access their desktops on any capable device, such as a traditional personal computer, laptop computer, smartphone, thin client, etc.

One advantage provided by VDI is that significant portions of the software environment can be centrally operated, maintained, patched, upgraded, backed-up, protected, and managed. The staffing hours required by organizations can be considerably reduced and higher levels of performance, availability, and reliability can be achieved.

DESCRIPTION OF EXAMPLE EMBODIMENTS

Overview

Devices, methods and instructions encoded on computer readable medium are provided herein for management of virtual desktop infrastructure (VDI) sessions in a VDI system using real-time network conditions. In one example, a request for allocation of bandwidth to a first VDI session configured to operate in parallel with a plurality of other VDI sessions in a network is received at a network device. The real-time conditions of the network are detected, and the network device uses these real-time network conditions to determine if sufficient bandwidth is available to satisfy the request for allocation of bandwidth to the first VDI session. A determination is then performed, based on one or more provisioned policies, to determine how bandwidth is to be allocated between the first VDI session and the other parallel VDI sessions. Bandwidth may then be allocated to the first VDI session in accordance with the one or more provisioned policies.

Example Embodiments

Figure 1:
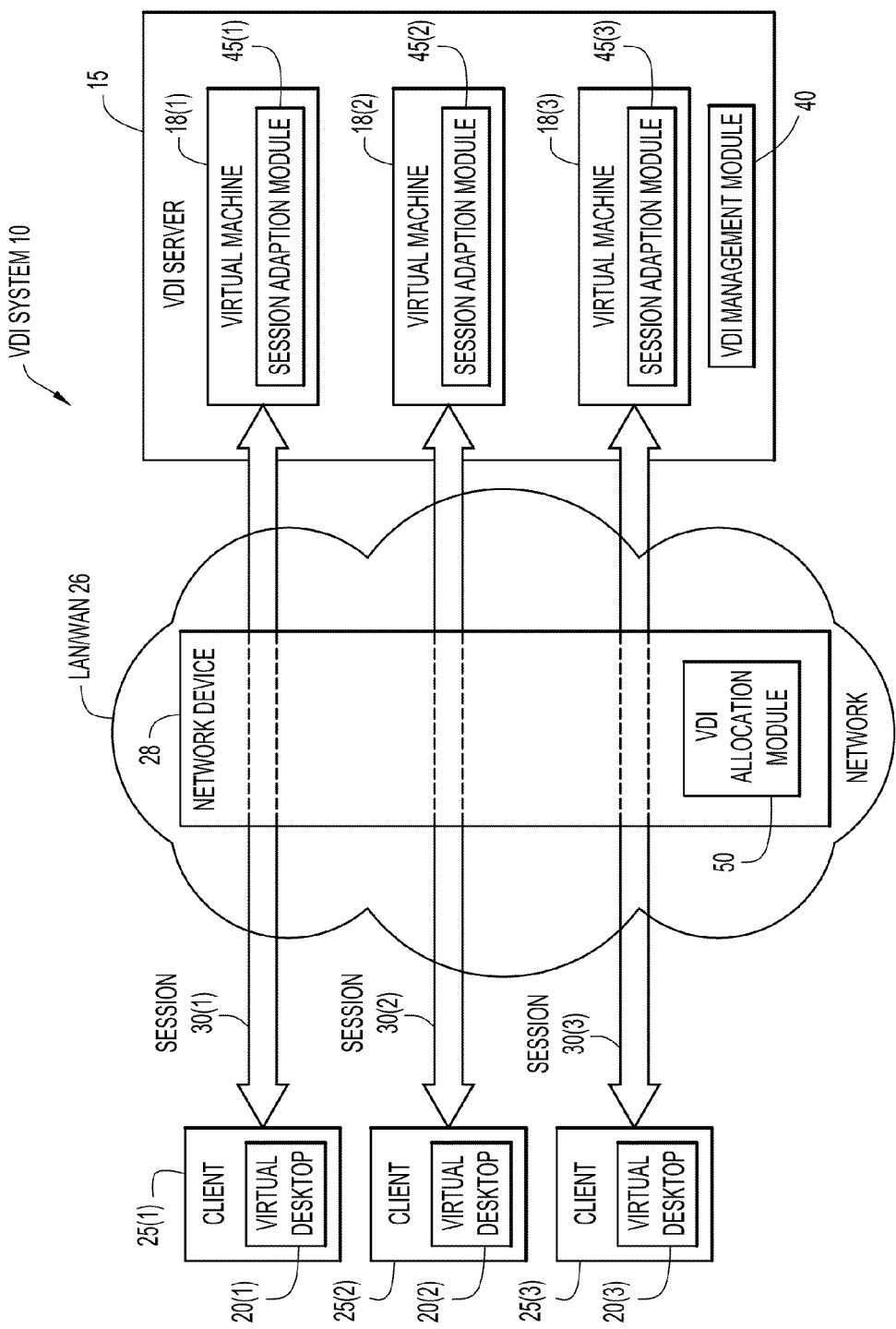
FIG. 1 is a schematic diagram of a VDI system configured for management of VDI sessions using real-time network conditions.

FIG. 1 is a block diagram of an example VDI system 10 comprising a VDI server 15 that hosts virtual machines 18(1), 18(2), and 18(3) each configured to provide a virtual desktop 20(1), 20(2), and 20(3), respectively, to users. VDI server 15 may be located in, for example, a data center. Remote users may access the virtual desktops 20(1), 20(2), and 20(3) via physical computer systems 25(1), 25(2), and 25(3), respectively. These physical computer systems 25(1)-25(3) are referred to herein as client terminals or simply clients. Clients 25(1)-25(3) are located, for example, at an enterprise, branch, campus, etc., and are connected to VDI server 15 via a network 26. The clients 25(1)-25(3) may comprise a thin client or a client software program running on a thick client such as a desktop computer, laptop, mobile device (e.g., tablet computer or smart phone), etc. Similarly, network 26 may comprise, for example, a local area network (LAN) or a wide area network (WAN), such as the Internet, serviced by one or more network devices 28 (e.g., hub, router, modem, proxy, repeater, etc.). For ease of illustration, only one network device 28 is shown in FIG. 1.

In operation, a VDI "session" 30(1), 30(2), and 30(3) is established, via network device 28, between the VDI server 15 and each of the clients 25(1), 25(2), and 25(3), respectively. VDI sessions (simply referred to herein as sessions) 30(1), 30(2), and 30(3) each comprise a connection in which a virtual machine 18(1), 18(2), or 18(3) provides a corresponding virtual desktop 20(1), 20(2), and 20(3) for display to the user at each of the clients 25(1), 25(2), and 25(3), respectively. The virtual desktops 20(1)-20(3) are interactive user environments provided by operating systems and applications running within the virtual machines 18(1)-18(3).) Virtual desktops 20(1)-20(3) generally include a graphical display and may include other outputs such as audio, indicator lamps, tactile feedback, etc. The virtual desktops 20(1)-20(3) are also generally configured to accept inputs from the user via, for example, a keyboard, a mouse, a touch screen, etc. In addition to user input/outputs, the virtual desktops 20(1)-20(3) may also send and receive device data, such as input/output for a FLASH memory device, local printer, etc.

VDI server 15 may be one or more physical computer systems or virtual machines that execute virtual management software (VDI software) to generate virtual machines 18(1)-18(3) and in turn provide virtual desktops 20(1)-20(3). The VDI software is represented in FIG. 1 as VDI management module 40. The VDI management module 40 is configured to manage pools of computer resources in order to execute virtual machines 18(1)-18(3) on a set of clusters typically containing multiple servers with central processing units (CPUs), memory, and communications hardware (network devices). In the example of FIG. 1, virtual machines 18(1), 18(2), and 18(3) each comprise a session adaption module 45(1), 45(2), and 45(3), respectively. As described further below, session adaption modules 45(1)-45(3) are configured to facilitate integration between the network 26 and the virtual management software to provide a new deterministic approach for adapting one or more VDI sessions based on real-time network conditions/characteristics.

Multiple parallel sessions may be simultaneously established between VDI server 15 and various clients with one virtual desktop instance for each session. These sessions are considered to be in parallel because they all share bandwidth in the network 26. For ease of illustration, only three sessions 30(1)-30(3) are shown in FIG. 1. Each of these sessions 30(1)-30(3) will consume some amount of the limited communication resources (bandwidth) provided by network device 28. Each session 30(1)-30(3) may also include one or more "channels" (not shown in FIG. 1) that correspond to applications or activities executed within the virtual desktops. For example, channels may exist for streaming videos or music, printing applications, productive tools (e.g., word processing applications), or any other activity conducted within a desktop environment. Channels associated with streaming videos or music may consume larger amounts of bandwidth than channels associated with printing or word processing applications. As such, the size (bandwidth consumed) by a session is related to the number of existing channels and the activities associated with those channels.

It is possible that, in certain situations, the network 26 may have insufficient bandwidth to satisfy the demands of all parallel sessions. As such, several conventional mechanisms have been developed to manage such circumstances. These conventional mechanisms execute a reactive process in which the virtual management software allocates each session an amount of bandwidth that will be consumed (and possibly exceeded) by the sessions. The sessions do not interact with the network when the sessions increase their bandwidth consumption and, to a large extent, each session operates independently from the other sessions. However, the software will monitor the sessions for one or both of packet loss or latency (delays) in transmissions received at the endpoint (client).

When packet loss or latency is detected, the conventional mechanisms will reduce the bandwidth of their transmissions in order to alleviate the detected issue. In other words, these conventional mechanisms constantly adapt, in a reactive manner, to observed results of the transmitted stream (i.e., detected session or flow characteristics). These characteristics provide the software with an indirect indication that problems exist in the network (i.e., causing the packet loss and/or latency), but do not provide context into what is actually occurring in the network so as to cause the loss and latency. Instead, these conventional mechanisms merely allow the software to draw conclusions based on the overall network effect, and do not consider the actual characteristics of the network (i.e., the real-time network conditions causing the specific behavior of the VDI sessions).

The conventional reactive mechanisms have several drawbacks that limit their effectiveness for use with VDI. For example, as noted above, there may be multiple sessions through one or more network devices defining a limited bandwidth. In practice, all of these different sessions will experience substantially the same overall network effects. Because the conventional arrangements merely determine the overall network effects (packet loss and latency) on the various sessions, and there is no awareness as to what is happening within the network, the conventional mechanisms will try to reduce the bandwidth of all of the sessions. As such, there is a wave-like motion where the bandwidth of all (or a substantial number) of the parallel sessions is reduced. Similarly, when the network conditions indicate that the packet loss and latency have subsided, there may be a corresponding increase in the bandwidth of all (or a substantial number) of the parallel sessions. This results in regular waves between underutilization and overutilization within the network. In summary, because current techniques detect the same conditions for all sessions, the bandwidth for all sessions will be correspondingly reduced.

Because the conventional mechanisms are reactive (i.e., rely upon the detection of packet loss or latency before taking effect), one or more users will be necessarily exposed to some degree of degraded performance before corrective action is taken. Furthermore, these conventional mechanisms lack the ability to adapt the various content within a single session based on network changes and simply reduce the total bandwidth consumed based on the detected overall network effects. Also, each session will generally attempt to consume its allocated bandwidth and will independently adjust its traffic with unpredictable effect on other sessions (in cases of congestion). As such, all users have the ability to negatively impact the performance of other parallel sessions. For example, one person watching a movie at work may negatively impact another person who is attempting to use productive tools to complete a work-related project. The above effects are a direct result of the way these conventional mechanisms operate (i.e., to merely observe overall network effects like packet loss and latency). In summary, these conventional mechanisms do not provide the capability of managing a VDI as a whole and monitor/adapt the behavior of individual sessions.

Disclosed herein are new management techniques that provide integration between the network and the VDI application (software). In particular, the disclosed techniques operate to determine real-time network conditions (as opposed to simple overall network effects) in order to facilitate adaption of specific VDI sessions, and possibly adaption of specific channels, within a VDI system. Generally, one example technique is to integrate network services with a VDI software application and provide the VDI application with the ability to perform session and/or channel adaption. Another example technique is to utilize an in-path network device to manage/adapt the VDI sessions. These new techniques are executed, at least in part, at session adaption modules 45(1)-45(3) in virtual machine machines 18(1)-18(3) and/or at VDI allocation module 50 in network device 28. Further details of session adaption modules 45(1)-45(3), VDI allocation module 50, and other elements are provided below.

Figure 2:
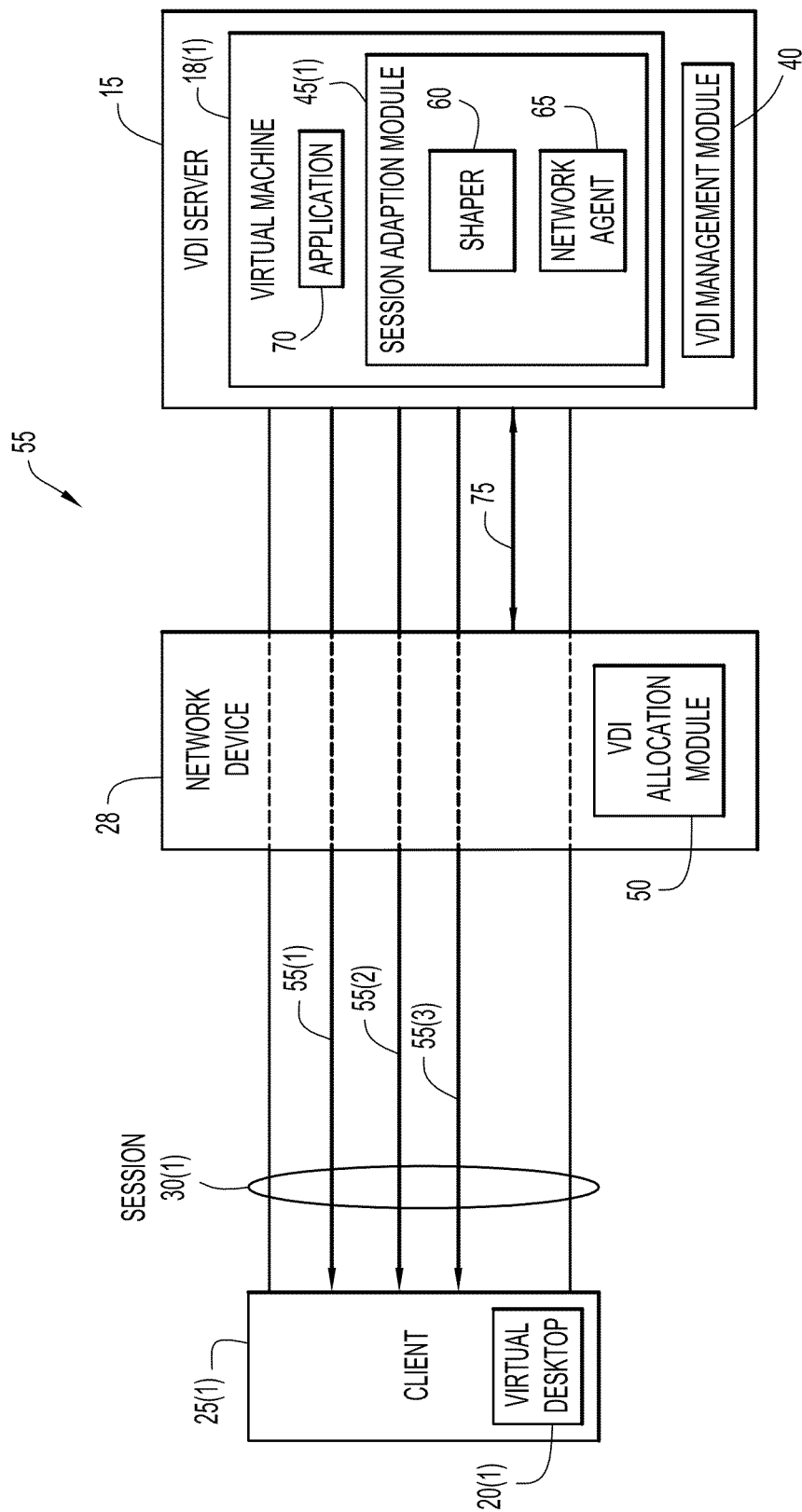
FIG. 2 is a schematic diagram of one example of a VDI system using on-path discovery of real-time network conditions.

FIG. 2 is a block diagram of a VDI system 55 configured to integrate network services with a VDI application having the ability to perform session and/or channel adaption. In this example, certain protocols, such as the Remote Desktop Protocol (RDP), may be leveraged to obtain the real-time network conditions that enable session and/or channel adaption (shaping) at an end host (i.e., session adaptation at the VDI server). More specifically, FIG. 2 illustrates a VDI system 55 configured for dynamic policy enforcement and network-based session adaption.

The VDI system 55 comprises client 25(1), network device 28, and VDI server 15. A VDI session 30(1) is established between VDI server 15 and client 25(1) so that virtual machine 18(1) provides a virtual desktop 20(1) to a user at the client 25(1). As noted above, session 30(1) may be executed in parallel with other sessions providing virtual desktops to different users. For ease of illustration, any other parallel sessions and associated clients have been omitted from FIG. 2.

VDI server 15 comprises a virtual management module 40 (FIG. 1), and virtual machine 18(1) includes session adaption module 45(1). Session adaption module 45 further comprises a display protocol (DP) shaper 60 and a network agent 65. As described further below, shaper 60 and network agent 65 interact with a VDI allocation module 50 to obtain information regarding the network load and subsequently adapt session 30(1) based on this information.

In one example, the session 30(1) initially includes two channels 55(1) and 55(2) each corresponding to an open application within the virtual desktop 20(1). The shaper 60 detects the opening of a new application 70 that results in another channel 55(3). The attributes of the new channel 55(3) are provided to network agent 65. These channel attributes may include, for example, channel type (bulk, interactive, real-time, display), media type (e.g., printer vs. Universal Serial Bus (USB) storage), application type (e.g., browser or productivity application such as a word processing application), etc.

Using the channel attributes, the network agent 65 contacts network device 28 to obtain additional bandwidth for the new channel 55(3) (i.e., for allocation of additional bandwidth to the session). The network device 28, and more specifically VDI allocation module 50, will determine if (and how much) bandwidth is available, and if/how bandwidth should be allocated to session 30(1) for the new channel 55(3). As described further below, this process may be based on current network state/conditions and provisioned policy. Network device 28 may then notify network agent 65 of how much bandwidth has been allocated to session 30(1). The interaction between client agent 65 and network device 28, which is illustrated in FIG. 2 by arrow 75, may be via a protocol such as the RDP. Using the allocated bandwidth, the shaper 60 shapes the channel and/or session 30(1) (or other parallel sessions) to confirm the VDI system to the allocated bandwidth. This shaping occurs before the channel is inserted into the display protocol session.

As noted above, in response to a request for bandwidth from network agent 65, the VDI allocation module 50 in network device 28 determines if, and/or how much, bandwidth should be allocated to session 30(1). In order to determine how much should be allocated, the VDI allocation module 50 may perform in-path discovery of current network resources to determine if additional bandwidth is available. In one example, in-path discovery is performed using the Resource-Reservation Protocol (RSVP).

In addition to determining if bandwidth is available, VDI allocation module 50 may use one or more provisioned policies and/or the attributes of the new channel 55(3) (e.g., attributes of application 70) to determine if the session 30(1) should be allocated additional bandwidth. That is, VDI allocation module 50 executes an authorization or policing process in which the session 30(1), the user associated with the session, and/or the channel attributes are evaluated to determine if any available bandwidth should actually be allocated to session 30(1).

More specifically, the initial request received at network device 28 from network agent 65 for allocation of additional bandwidth may include not only the desired bandwidth, but also include embedded information that may be used by the VDI allocation module 50 to determine if/how much additional bandwidth should be allocated. This embedded information may include session parameters such as, for example, a priority of the user at virtual desktop 20(1) and rights assigned to the user. This priority may be generated at the VDI server 15 and may be different based on the user's status within an organization (e.g., chief executive officer (CEO), financial user, engineer, student, professor), the user's location (e.g., in a branch, remote location, etc.), or other criteria. In another example, the embedded session parameters may include attributes of the new channel, such as the type of stream (e.g., streaming video, productivity tool, printing, etc.). A comparison of the embedded information is made to static or dynamic policies so that the VDI allocation module 50 can determine if session 30(1) should be allocated the additional requested bandwidth. In one example, an organization includes a first "sales" user group that is allocated (allowed) up to 5 Mbps of video channel, and a second "engineer" user group that is allocated up to 1 Mbps of video channel. Everyone else in the organization may be allocated else allow up to 10 Mpbs of aggregate bandwidth of video channels. This information would be used by the VDI allocation module 50 to determine if/how much additional bandwidth should be allocated in response to new or additional requests.

In summary, the network device 28 may perform two or more different procedures in response to a request for the allocation of additional bandwidth to session 30(1). In one procedure, the network device 28 performs in-path discovery to determine the current status of the network and real-time network conditions such as link congestion in the path. This enables the network device 28 to determine if additional bandwidth is available for use by session 30(1). In the second procedure, information (e.g., user priority, channel attributes, etc.) embedded in the bandwidth request is evaluated with respect to one or provisioned policies to determine if/how available bandwidth should be allocated to the session 30(1).

In certain examples, the network device 28 will notify session adaption module 45 that the session 30(1) has been allocated less than the desired bandwidth, or that the bandwidth currently used by session 30(1) should be reduced. In such circumstances, shaper 60 is configured to evaluate the various channels 55(1)-55(3) and adapt the flow to fit within the allocated bandwidth. This evaluation and corresponding adaption may be based on the attributes of each of the various channels such that the various channels are prioritized and larger amounts of bandwidth are given to the channels with higher relative priority. For example, shaper 60 may be configured to downgrade video streams to conserve bandwidth (i.e., convert high-definition streams to standard definition), delay print traffic, cancel certain channels, schedule content that requires less delay and jitter ahead of the rest of the content in the session, etc. As such, shaper 60 may adapt the session as a whole, or may adapt selected channels. The adaption (adaptation) policy may be configured on the network device 28. One such example is based on the channel type priority, higher priority channels pre-empt lower priority channels.

The example of FIG. 2 has been primarily described with reference to the addition of a channel to an existing session 30(1). It is to be appreciated that the above operations may be performed on a dynamic basis when new sessions are added in parallel to existing sessions. This process ensures that the VDI system 55 is regularly optimized as sessions are added. For example, there may initially be ten (10) parallel sessions and, subsequently, ten (10) more users are added. Because the above described techniques take into account the actual real-time conditions of the network, rather than just a general overall effect, the bandwidth of the network device 28 may be allocated between these total of twenty (20) based on the priority of the users or other factors and not merely equally shared as in conventional arrangements.

Figure 3:
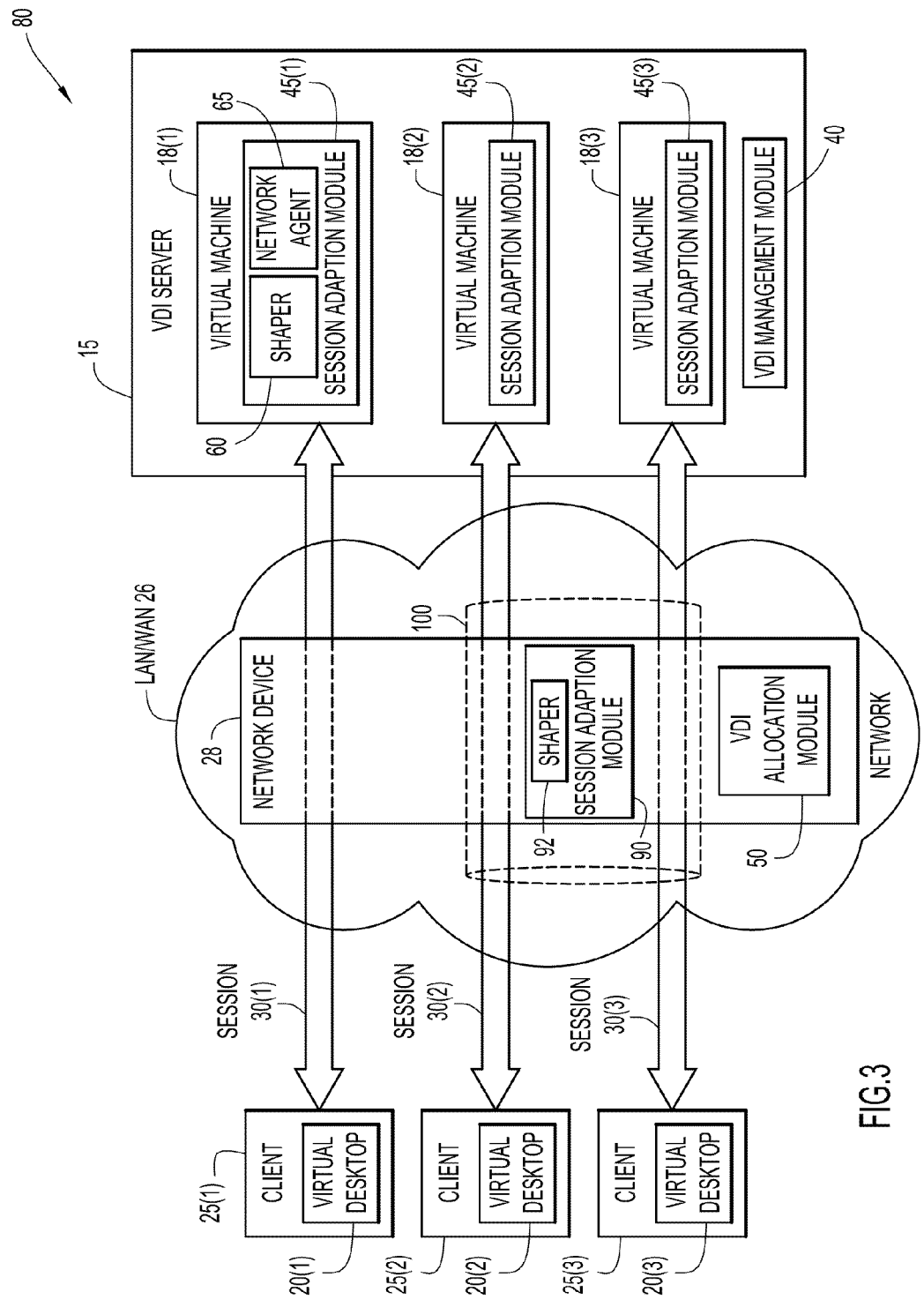
FIG. 3 schematic diagram of another example of a VDI system using an in-path network device to detect real-time network conditions.

FIG. 3 illustrates an example VDI system 80 in which an in-path network device (e.g., VDI gateway or proxy functionality in a Wide Area Application Services (WAAS)) 85 is used to manage the resources for a VDI session. VDI system 80 comprises a VDI server 15 executed as described above with reference to FIG. 1 to provide virtual machines 18(1), 18(2), and 18(3), establish sessions 30(1), 30(2), and 30(3) with clients 25(1), 25(2), and 25(3), respectively, and display virtual desktops 20(1), 20(2), and 20(3).

Network device 85 is, in this example, an in-path network device that has visibility inside the VDI protocol used in sessions 30(1)-30(3). As such, visibility and allocation module 50 is aware of the various sessions and the channels within the sessions and has the ability to accurately determine what is happening in the session. For example, visibility and allocation module 50 can determine the user associated with each session, the applications in use, the bandwidth used by each application, etc. In other words, visibility and allocation module 55 has knowledge of the network load, as well as the causes/distribution of load and can use this information to determine how much bandwidth is available and/or needed to service session 30(1) along with any other parallel sessions.

More specifically, in this scheme the network device 85 is configured to extract the session parameters (e.g., user name, priority, channel attributes) by intercepting and proxying the various sessions 30(1)-30(3). Based on this information (along with any determined real-time network conditions), session bandwidth may be reserved using network reservation schemes.

Once the real-time network conditions and session parameters are determined, VDI allocation module 50 may determine if bandwidth is available and if any such bandwidth should be allocated to the various sessions. These two procedures are executed substantially as described above with reference to FIG. 2. However, in contrast to the example of FIG. 2, the results of these allocation and policing procedures are not necessarily provided to VDI server 15 for session adaption. Instead, in the example of FIG. 2 the session adaption may be performed at a session adaption module 90 in network device 85. Session adaption module 90 includes a shaper 95 having substantially at least the same capabilities as shaper 60 in VDI server 15.

Therefore, in the example of FIG. 3 the network device 85 adapts the channels within the session(s) to the allocated available resources. For example, the network device 85 may be able to drop certain non-critical channel data (like older screen refresh data) during congestion with no/minimal impact to the session(s).

Although the adaption is performed at network device 85, it is to be appreciated that, even if the VDI server 15 initially transmits sessions have higher bandwidth, due to congestion notifications transmitted by network device 85, the session adaption modules 45(1)-45(3) (each including a shaper and network agent as described above with reference to FIG. 2) will eventually begin to perform at least some session adaption so that the sessions fit within the allocated bandwidth.

Furthermore, by intercepting and proxying the sessions, network device 85 can group the sessions into different priority classes based on session static attributes, such as Transmission Control Protocol (TCP)/User Datagram Protocol (UDP) flow tuple, client group, user identity, host or virtual machine, etc. Management policies can be defined to reserve bandwidth for each group and to shape its traffic based on the group's priority (e.g., give larger amounts of the bandwidth to high priority client group(s)). Any remaining amount of the bandwidth allocated to a higher priority group can be distributed dynamically between other groups (the same, lower or higher priority, depending on the configuration). This ensures that sessions within each group do not impact sessions in other groups. FIG. 3 illustrates an example in which sessions 30(2) and 30(3) are grouped into a higher priority group 100, while the remaining session 30(1) is part of a lower priority group 105. As would be appreciated, these groups may include different numbers of different sessions, including a single session.

Additionally, intercepting and proxying the sessions 30(1)-30(3) enables the network device 85 to examine not only the session priority, but also to examine the channels inside each display protocol session. As such, sessions can be grouped based on their channel mix, and the bandwidth allocated accordingly. It is to be appreciated that policies can also be defined to shape the traffic based on channel mix inside a session. For example, all sessions with just bulk traffic channels may be grouped and shaped at a lower rate. This ensures that sessions with video are not impacted by the sessions with bulk traffic. If a channel is added/deleted from a session, the session shaping and group mapping is updated.

In summary, the example of FIG. 3 uses some type of network device (e.g., gateway, proxy, etc.) that is sitting in the path that has visibility inside the display protocol(s). This network device is, in effect, a pseudo host sitting in the network that it is aware of the various channels, who is using the desktop, etc. The network device provides the handshake between the desktop traffic and the network.

It is to be appreciated that the examples of FIGS. 2 and 3 are not mutually exclusive and, in certain circumstances, may be combined in different configurations. For example, one variation may use the in-path discovery techniques (described with reference to FIG. 2) in combination with session adaption at the network device (described with reference to FIG. 3). Another example may use the on-path detection (described with reference to FIG. 3) in combination with the VDI adaption (described with reference to FIG. 2).

Figure 4:
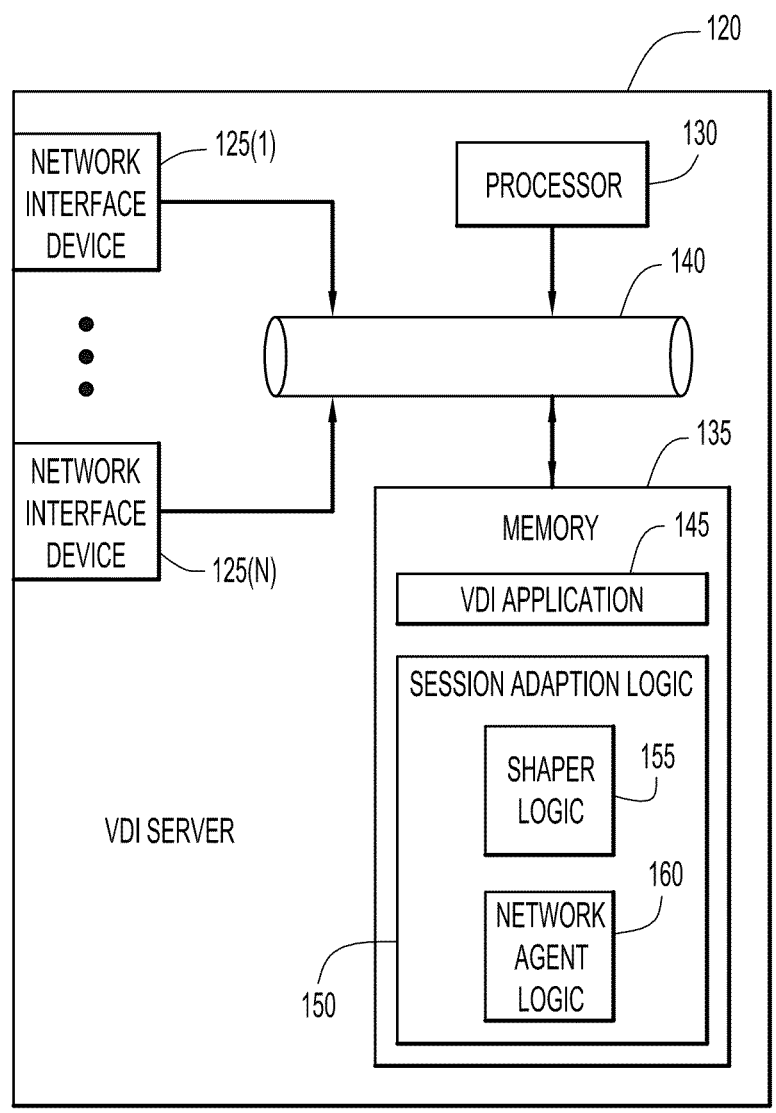
FIG. 4 is a block diagram of an example VDI server configured for adaption of VDI sessions based on real-time network conditions.

FIG. 4 is a block diagram of a VDI server 120 configured in accordance with examples described herein. As shown, VDI server 120 comprises a plurality of network interface devices 125(1)-125(N). The network interface devices 125(1)-125(N) may be any combination of wired or wireless interfaces that are configured to connect the VDI server 120 to other network elements, such as other servers, network devices, databases, etc.

VDI server 120 further includes a processing capability represented in FIG. 4 by processor 130. Processor 130 is capable of executing program instructions (i.e., software) for carrying out various operations and tasks. For example, processor 130 can interpret and respond to data and commands received from network interface devices 125(1)-125(N), perform computations, initiate the transmission of message signals via network interface devices 125(1)-125(N), initiate information storage, etc. Processor 130 is, for example, a microprocessor, a microcontroller, a digital signal processor, etc.

A storage capability of VDI server 120 is represented by a memory module 135 which may comprise read only memory (ROM), random access memory (RAM), magnetic disk storage media devices, optical storage media devices, flash memory devices, electrical, optical, or other physical/tangible memory storage devices. In this example, memory 135 comprises virtual desktop software, shown as VDI application 145, and session adaption logic 150. Session adaption logic 150 further comprises shaper logic 155 and network agent logic 160. Thus, in general, the memory 135 may comprise one or more tangible (non-transitory) computer readable storage media (e.g., a memory device) encoded with software comprising computer executable instructions and when the software is executed (by the processor 130) it is operable to perform the operations described herein in connection with VDI management module 145 (through execution of VDI management application 145) and session adaption module 45 (though execution of session adaption logic 150).

The interconnections between the components of VDI server 120 are represented generally in FIG. 4 with a bus structure 140. In general, network interface devices 125(1)-125(N), processor 130, and memory module 135 can be interconnected in any suitable manner.

While FIG. 4 shows a processing environment comprising a data processor 130 that executes software stored in storage/memory module 135, an alternative processing environment may include a fixed data processing element, such as an application specific integrated circuit (ASIC) that is configured, through fixed hardware logic, to perform the functions of the logic. Yet another possible data processing environment is one involving one or more field programmable logic devices or firmware, or a combination of fixed processing elements and programmable logic devices. Additionally, in alternative examples VDI server 120 may comprise a pool of computer resources that collectively execute virtual desktops on a set of clusters typically containing multiple servers with separate central processing units (CPUs), memory, and communications hardware (network devices).

Figure 5:
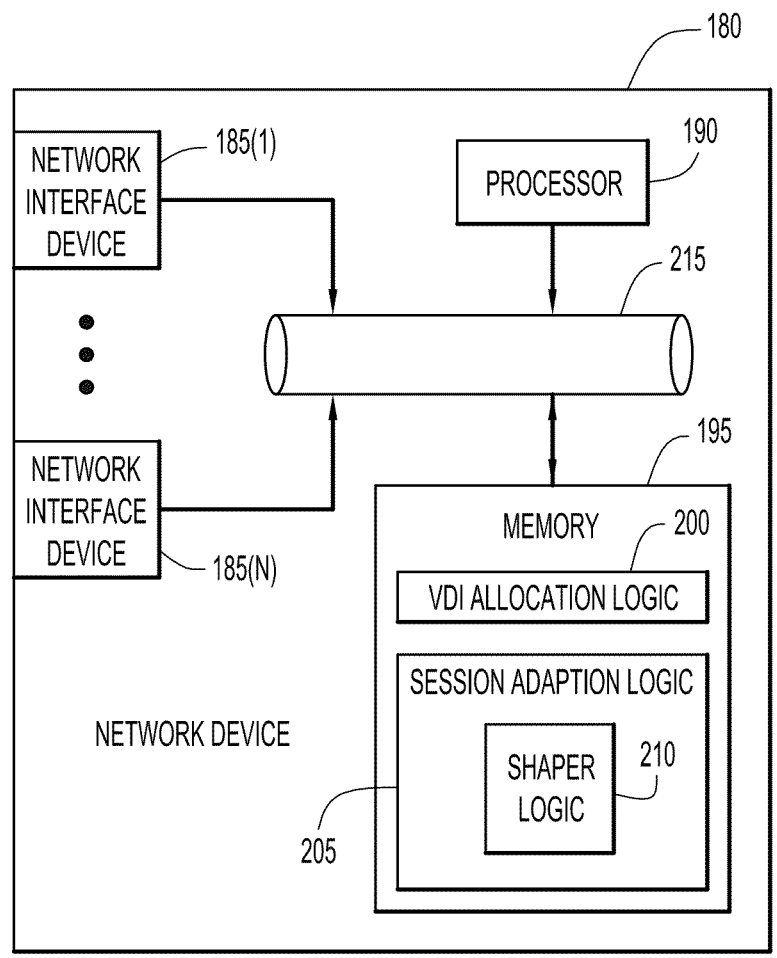
FIG. 5 is a block diagram of an example network device configured for adaption of VDI sessions based on real-time network conditions.

FIG. 5 is a block diagram of a network device 180, such as a VDI gateway, proxy, router, etc. configured in accordance with examples described herein. As shown, network device 180 comprises a plurality of network interface devices 185(1)-185(N). The network interface devices 185(1)-185(N) may be any combination of wired or wireless interfaces that are configured to connect the network device 180 to other network elements, such as servers, other network devices, clients, etc.

Network device 180 further includes a processing capability represented in FIG. 5 by processor 190. Processor 190 is capable of executing program instructions (i.e., software) for carrying out various operations and tasks. For example, processor 190 can interpret and respond to data and commands received from network interface devices 185(1)-185(N), perform computations, initiate the transmission of message signals via network interface devices 185(1)-185(N), initiate information storage, etc. Processor 190 is, for example, a microprocessor, a microcontroller, a digital signal processor, etc. As would be appreciated, the various operations performed by processor 190 may depend on the type and specific configuration of the network device.

A storage capability of network device 180 is represented by a memory module 195 which may comprise read only memory (ROM), random access memory (RAM), magnetic disk storage media devices, optical storage media devices, flash memory devices, electrical, optical, or other physical/tangible memory storage devices. In this example, memory 195 comprises VDI allocation logic 200, and (in accordance with the example of FIG. 3) session adaption logic 205. Session adaption logic 205 further comprises shaper logic 210. Thus, in general, the memory 195 may comprise one or more tangible (non-transitory) computer readable storage media (e.g., a memory device) encoded with software comprising computer executable instructions and when the software is executed (by the processor 190) it is operable to perform the operations described herein in connection with VDI allocation module 50 (through execution of VDI allocation logic 200) and session adaption module 90 (though execution of session adaption logic 205).

The interconnections between the components of network device 180 are represented generally in FIG. 5 with a bus structure 215. In general, network interface devices 185(1)-185(N), processor 190, and memory 195 can be interconnected in any suitable manner.

While FIG. 5 shows a processing environment comprising a data processor 190 that executes software stored in storage/memory module 195, an alternative processing environment may include a fixed data processing element, such as an ASIC that is configured, through fixed hardware logic, to perform the functions of the logic. Yet another possible data processing environment is one involving one or more field programmable logic devices or firmware, or a combination of fixed processing elements and programmable logic devices.

Figure 6:
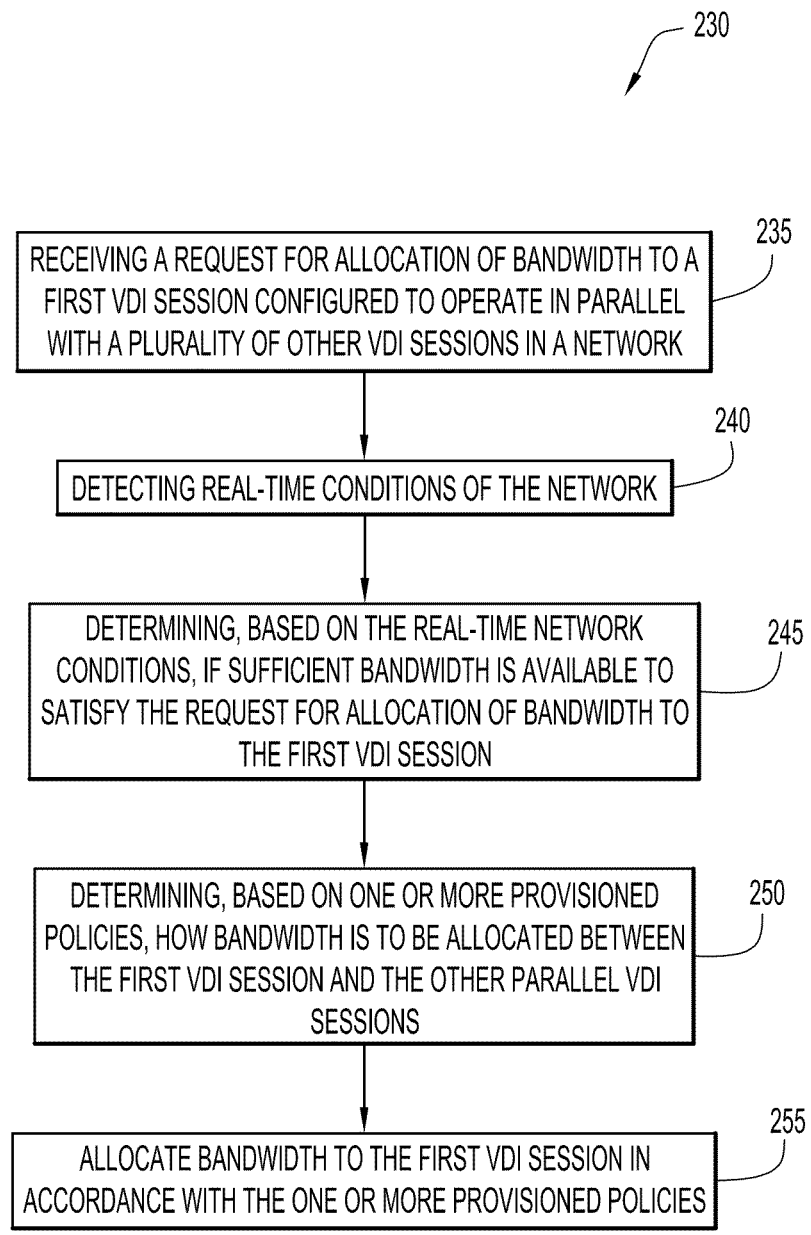
FIG. 6 is a flowchart illustrating a method for management of VDI sessions using real-time network conditions.

FIG. 6 is a flowchart illustrating a method 230 for management of VDI sessions in a VDI system using real-time network conditions. First, at 235 a request for allocation of bandwidth to a first VDI session is received. The first VDI session is configured to operate in parallel with a plurality of other VDI sessions in a network. At 240, real-time conditions of the network are detected. At 245, a determination is made, based on the real-time network conditions, as to whether sufficient bandwidth is available to satisfy the request for allocation of bandwidth to the first VDI session. At 250, a determination is made, based on one or more provisioned policies, as to how bandwidth is to be allocated between the first VDI session and the other parallel VDI sessions. At 255, bandwidth is allocated to the first VDI session based on the above determinations.

The above description is intended by way of example only.

What is claimed is:

1. In a virtual desktop infrastructure (VDI) system including client devices and a VDI server to connect with the client devices through a network device in a network between the VDI server and the client devices, a method of managing VDI sessions using real-time conditions of the network performed at the network device, comprising:
   receiving from the VDI server via the network a request for allocation of bandwidth to a first VDI session established, through the network device, between a virtual machine hosted on the VDI server and a client device so as to provide a virtual desktop thereto, wherein the first VDI session is configured to operate in parallel with a plurality of other VDI sessions established through the network device and that provide respective virtual desktops to other client devices and share bandwidth in the network device with the first VDI session, wherein the request for allocation includes information embedded therein that a priority of a user of the first VDI session;
   detecting real-time conditions of the network;
   determining, based on the real-time network conditions, whether sufficient bandwidth is available to satisfy the request for allocation of bandwidth to the first VDI session;
   determining, based on one or more provisioned policies and the priority of the user of the first VDI session, how bandwidth is to be allocated between the first VDI session and the other VDI sessions;
   allocating bandwidth to the first VDI session in accordance with the one or more provisioned policies; and
   notifying the VDI server, via the network, of the allocated bandwidth.

2. The method of claim 1, wherein if insufficient bandwidth is available to satisfy the request for allocation of bandwidth to the first VDI session, further comprising:
   adapting one or more of the first VDI session or the other VDI sessions in accordance with the one or more provisioned policies for operation in the available bandwidth.

3. The method of claim 2, further comprising:
adapting one or more of the first VDI session or the other VDI sessions at the VDI server.

4. The method of claim 2, further comprising:
adapting one or more of the first VDI session or the other VDI sessions at the in-path network device.

5. The method of claim 2, wherein the first VDI session comprises a plurality of channels, and wherein adapting one or more of the first VDI session or the other VDI session comprises:
adapting the first VDI session based on the attributes of each of the plurality of channels.

6. The method of claim 1, further comprising:
receiving information embedded in the request for allocation of bandwidth to the first VDI session, and wherein determining how bandwidth is to be allocated to the first VDI session and the other VDI sessions comprises:
comparing the information embedded in the request to the one or more provisioned policies.

7. The method of claim 6, wherein receiving information embedded in the request comprises:
receiving information regarding the priority of a user of the first VDI session.

8. The method of claim 6, wherein the first VDI session comprises a plurality of channels, and wherein receiving information embedded in the request comprises:
receiving attributes of each of the plurality of channels.

9. The method of claim 1, wherein detecting real-time network conditions comprises:
performing on-path discovery of the network.

10. The method of claim 1, wherein the network device is a router device in the network.

11. The method of claim 1, wherein the priority of the user is based on a status of the user within an organization and a location of the user.

12. The method of claim 1, wherein:
the information embedded in the request for allocation further includes attributes to indicate a type of channel to be used for the first VDI session, including whether the type of channel is for video; and
the determining, based on the one or more provisioned policies and the priority of the user of the first VDI session, how bandwidth is to be allocated between the first VDI session and the other VDI sessions further includes determining, based on the one or more provisioned policies, the priority of the user of the first VDI session, and the indicated type of channel, how bandwidth is to be allocated between the first VDI session and the other VDI sessions.

13. One or more non-transitory computer readable storage media encoded with software comprising computer executable instructions and when the software is executed, at a network device in a virtual desktop infrastructure (VDI) system including client devices and a VDI server to connect with the client devices through the network device in a network between the VDI server and the client devices, the software is operable to:
receive from the VDI server via the network a request for allocation of bandwidth to a first VDI session established, through the network device, between a virtual machine hosted on the VDI server and a client device so as to provide a virtual desktop to the client device, wherein the VDI session is configured to operate in parallel with a plurality of other VDI sessions established through the network device and that provide respective virtual desktops to other client devices and share bandwidth in the network device with the first VDI session, wherein the request for allocation includes information embedded therein that includes a priority of a user of the first VDI session;
detect real-time conditions of the network;
determine, based on the real-time network conditions, whether sufficient bandwidth is available to satisfy the request for allocation of bandwidth to the first VDI session;
determine, based on one or more provisioned policies and the priority of the user of the first VDI session, how bandwidth is to be allocated between the first VDI session and the other parallel VDI sessions;
allocate bandwidth to the first VDI session in accordance with the one or more provisioned policies; and
notify the VDI server, via the network, of the allocated bandwidth.

14. The computer readable storage media of claim 13, further comprising instructions operable to:
if insufficient bandwidth is available to satisfy the request for allocation of bandwidth to the first VDI session, adapt one or more of the first VDI session or the other VDI sessions in accordance with the one or more provisioned policies for operation in the available bandwidth.

15. The computer readable storage media of claim 14, further comprising instructions operable to:
adapt one or more of the first VDI session or the other VDI sessions at the VDI server.

16. The computer readable storage media of claim 14, further comprising instructions operable to:
adapt one or more of the first VDI session or the other VDI sessions at the in-path network device.

17. The computer readable storage media of claim 14, wherein the first VDI session comprises a plurality of channels, and wherein the instructions operable to adapt one or more of the first VDI session or the other VDI session comprise instructions operable to:
adapt the first VDI session based on the attributes of each of the plurality of channels.

18. The computer readable storage media of claim 13, further comprising instructions operable to:
receive information embedded in the request for allocation of bandwidth to the first VDI session, and wherein the instructions operable to determine how bandwidth is to be allocated to the first VDI session and the other VDI sessions comprise instructions operable to:
compare the embedded information to the one or more provisioned policies.

19. The computer readable storage media of claim 13, wherein the instructions operable to detect real-time network conditions comprise instructions operable to:
perform on-path discovery of the network.

20. An apparatus to manage virtual desktop infrastructure (VDI) sessions using real-time conditions of a network, comprising:
a plurality of network interfaces to connect in a network with and between a VDI server and client devices in a VDI system;
a processor configured to:
receive via the network a request for allocation of bandwidth to a first VDI session established, through the network interfaces, between a virtual machine hosted on the VDI server and a client device so as to provide a virtual desktop to the client device, wherein the VDI session is configured to operate in parallel with a plurality of other VDI sessions, established through the network interfaces, that provide respective virtual desktops to other client devices and share bandwidth across the plurality of network interfaces with the first VDI session, wherein the request for allocation includes information embedded therein that includes a priority of a user of the first VDI session;
detect real-time conditions of the network;
determine, based on the real-time network conditions, whether sufficient bandwidth is available to satisfy the request for allocation of bandwidth to the first VDI session;
determine, based on one or more provisioned policies and the priority of the user of the first VDI session, how bandwidth is to be allocated between the first VDI session and the other parallel VDI sessions;
allocate bandwidth to the first VDI session in accordance with the one or more provisioned policies; and
notify the VDI server, via the network, of the allocated bandwidth.

21. The apparatus of claim 20, wherein the processor is further configured, if insufficient bandwidth is available to satisfy the request for allocation of bandwidth to the first VDI session, to:
adapt one or more of the first VDI session or the other VDI sessions in accordance with the one or more provisioned policies for operation in the available bandwidth.

22. The apparatus of claim 21, wherein the processor is further configured to:
adapt one or more of the first VDI session or the other VDI sessions at the VDI server.

23. The apparatus of claim 21, wherein the processor is further configured to:
adapt one or more of the first VDI session or the other VDI sessions at the apparatus.

24. The apparatus of claim 21, wherein the first VDI session comprises a plurality of channels, and wherein processor is configured to:
adapt the first VDI session based on the attributes of each of the plurality of channels.

25. The apparatus of claim 20, wherein the processor is configured to:
receive information embedded in the request for allocation of bandwidth to the first VDI session, and wherein to determine how bandwidth is to be allocated to the first VDI session and the other VDI sessions the processor is configured:
compare the embedded information to the one or more provisioned policies.

26. The apparatus of claim 20, wherein to detect real-time network conditions the processor is configured to:
perform on-path discovery of the network.

* * * * *